Figure 1:
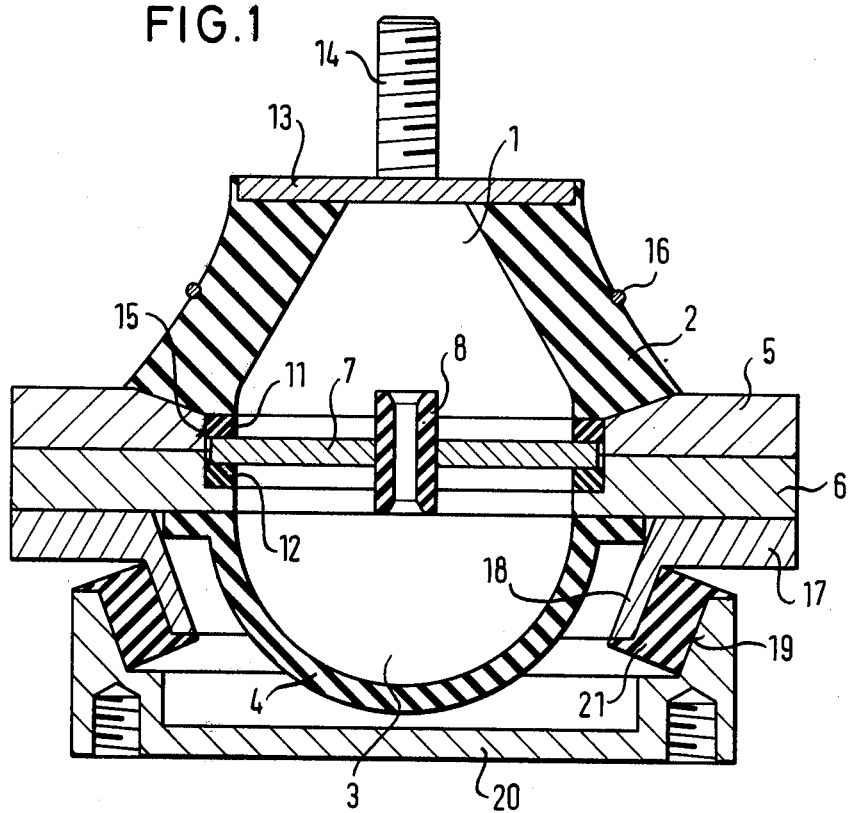

United States Patent [19]

Härtel et al.

[11] 4,418,897

[45] Dec. 6, 1983

[54] TWO-CHAMBER MOTOR MOUNT WITH HYDRAULIC DAMPING

[75] Inventors: Volker Härtel, Vallendar; Manfred Hofmann, Hünfelden, both of Fed. Rep. of Germany

[73] Assignee: Metzeler Kautschuk GmbH, Munich, Fed. Rep. of Germany

[21] Appl. No.: 244,652

[22] Filed: Mar. 17, 1981

[30] Foreign Application Priority Data

Jul. 22, 1980 [DE] Fed. Rep. of Germany ....... 3027742

[51] Int. Cl.³ .......................... F16F 9/10; F16F 15/04
[52] U.S. Cl. ................................ 267/140.1; 188/280; 248/562
[58] Field of Search .................... 267/136, 140.1, 141, 267/113, 116, 118, 120, 121, 123, 35; 188/280; 138/45; 248/562, 634

[56] References Cited

U.S. PATENT DOCUMENTS

| | | | |
|---|---|---|---|
| 3,658,314 | 4/1972 | Luzsicza | 267/35 |
| 3,837,363 | 9/1974 | Meronek | 138/45 |
| 4,054,312 | 10/1977 | Strader | 267/116 |
| 4,159,091 | 6/1979 | Le Salver et al. | 248/562 |

FOREIGN PATENT DOCUMENTS

| | | |
|---|---|---|
| 1805392 | 2/1960 | Fed. Rep. of Germany . |
| 2503581 | 8/1976 | Fed. Rep. of Germany ... 267/140.1 |
| 2718121 | 9/1978 | Fed. Rep. of Germany . |
| 575960 | 4/1958 | Italy ................. 267/140.1 |

*Primary Examiner*—Douglas C. Butler
*Assistant Examiner*—R. R. Diefendorf
*Attorney, Agent, or Firm*—Herbert L. Lerner; Laurence A. Greenberg

[57] ABSTRACT

Two-chamber motor mount with hydraulic damping, especially for vehicles, including an upper and lower chamber having rubber-elastic walls and being filled with liquid, the upper chamber being of hollow conical construction, a holding flange disposed between the walls of the upper and lower chambers, an intermediate plate formed with a throttle orifice located in vicinity of the holding flange, the upper and the lower chambers being connected to one another through the intermediate plate with the throttle orifice for preventing an hydraulic response for high frequency vibrations of small amplitude, the intermediate plate being responsive to high frequency vibrations of small amplitude and the throttle orifice being automatically closeable at high pressures.

8 Claims, 2 Drawing Figures

U.S. Patent     Dec. 6, 1983     4,418,897

TWO-CHAMBER MOTOR MOUNT WITH HYDRAULIC DAMPING

The invention relates to a two-chamber motor mount with hydraulic damping, especially for motor vehicles and, more particularly, such a motor mount having chambers which are filled with liquid and have rubber-elastic walls, the chambers being connected to one another by an intermediate plate formed with a throttle orifice. The throttle orifice is elastically supported to prevent an hydraulic response at high frequency vibrations with a small amplitude.

A motor mount of this general type has become known heretofore from German Petty Patent (DE-OM) No. 1 805 392, for example, wherein the intermediate plate has a throttle orifice of constant cross section. By supporting the intermediate plate in the rubber-elastic material of the upper and lower chambers per se, only a sealing effect is obtained, so that the damping as a whole is inadequate.

From a differently constructed two-chamber motor mount with a rubber-elastic partition such as is disclosed in German Published Prosecuted application (DE-AS) No. 27 18 121, a throttling element has become known which is a ring which can move axially within limits, and can vary the flow-through cross section depending upon the pressure differences in the chambers; however, this motor mount also exhibits an increasing damping effect at smaller load amplitude and, thereby, increasing stiffness or rigidity. In contrast thereto, it is an object of the invention of the instant application to provide a two-chamber motor mount which affords high damping with little stiffness so as to achieve an increased damping at higher amplitudes, and to suppress major shocks or jolts optimally, however, for high frequency vibrations with small amplitude, the mounting according to the invention should not respond hydraulically. Furthermore, optimal sound suppression should be accomplished.

With the foregoing and other objects in view, there is provided, in accordance with the invention, a two-chamber motor mount with hydraulic damping, especially for motor vehicles, comprising an upper and a lower chamber having rubber-elastic walls and being filled with liquid, the upper chamber being of hollow conical construction, a holding flange disposed between the walls of the upper and lower chambers, an intermediate plate formed with a throttle orifice located in vicinity of the holding flange, the upper and the lower chambers being connected to one another through the intermediate plate with the throttle orifice for preventing an hydraulic response for high frequency vibrations of small amplitude, the intermediate plate being responsive to high frequency vibrations of small amplitude and the throttle orifice being automatically closeable at high pressures.

In accordance with another feature of the invention, the throttle orifice is defined by a tube-shaped rubber insert extending substantially perpendicularly through the intermediate plate and having an oval inner cross section.

In accordance with a further feature of the invention, the tube-shaped rubber insert is automatically compressible by a chamber pressure of at least approximately 2 bar and of maximally 3 to 4 bar so as to close the flow-through cross section thereof.

In accordance with an additional feature of the invention, the intermediate plate is formed of elastically bendable material.

In accordance with an added feature of the invention, the intermediate plate is supported so as to vibrate.

In accordance with yet another feature of the invention, there are provided two soft rubber bearings having markedly progressive characteristic curves forming the vibrational support for the intermediate plate.

In accordance with yet a further feature of the invention, the lower chamber is of substantially hemispherical construction.

In accordance with yet an additional feature of the invention, the holding flange is of bipartite construction having an upper flange part whereon the hollow conical chamber wall of rubber-elastic material is seated, a face plate with a threaded bolt extending therefrom being disposed at the upper end face of the hollow conical chamber wall, the rubber-elastic wall of the lower chamber being in engagement with the lower flange part of the bipartite holding flange, the bipartite holding flange being formed with an inner peripheral groove wherein the intermediate plate formed with the throttle orifice is supported.

In accordance with yet an added feature of the invention, there is provided a metallic support surrounding and bracing the hollow conical upper chamber wall at the outside thereof.

In accordance with a concomitant feature of the invention, there is provided an additional, markedly progressive and low damping rubber bearing mounted on a support plate and supporting the heretofore defined features of the two-chamber motor mount, the heretofore defined features having a mass acting as intermediate mass of a series connection of the hydraulically damped heretofore defined features and the rubber bearing.

With such construction of the motor mount, what is achieved is that vibrations with small amplitude and high frequency are damped only minimally by the response of the intermediate plate, without any liquid exchange between the upper and the lower chambers while, for vibrations with amplitudes becoming greater and lower frequency, increased damping is effected by the increasing liquid exchange.

Other features which are considered as characteristic for the invention are set forth in the appended claims.

Although the invention is illustrated and described herein as embodied in a two-chamber motor mount with hydraulic damping, it is nevertheless not intended to be limited to the details shown, since various modifications and structural changes may be made therein without departing from the spirit of the invention and within the scope and range of equivalents of the claims.

Figure 2:
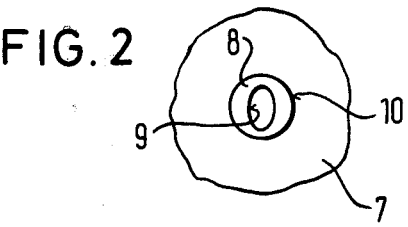

The construction and method of operation of the invention, however, together with additional objects and advantages thereof will be best understood from the following description of specific embodiments when read in connection with the accompanying drawings, in which:

FIG. 1 is a cross-sectional view of a two-chamber motor mount constructed in accordance with the invention; and FIG. 2 is a fragmentary top plan view of the intermediate plate with throttling member shown in FIG. 1.

Referring now to the figures of the drawing, there is shown therein a motor mount according to the invention formed essentially of an upper chamber 1, at the motor side, and a lower chamber 3, the two chambers 1 and 3 being separated by an intermediate plate 7 formed with a throttle opening or orifice 8. The upper chamber 1 is defined by a thick, hollow conical chamber wall 2 formed of rubber-elastic material and is closed at the upper end face thereof by a top face plane 13 with a threaded bolt 14 set thereon, and is connected at the lower end thereof with an upper flange 5 of a parted or bipartite holding flange 5 and 6, which serves for connection to a counter-bearing or opposed support to be described hereinafter. The lower chamber 3 is defined by a, for example, hemispherical chamber wall 4 formed likewise of a rubber-elastic material which is bonded to the lower flange 6.

Between the two chambers 1 and 3, an intermediate plate 7 is inserted in a circumferential groove 15 of the holding flanges 6 and 5, the intermediate plate 7 being retained in a soft rubber support, for example, in the form of two rubber rings 11 and 12 with a markedly progressive characteristic curve. A throttle 8 formed of a tube-like rubber insert is fixed in the center of the intermediate plate 7 and preferably has a circular outer cross-section 10, and an oval or elliptic inner cross-section 9.

The two-chamber-motor mount according to the invention functions as follow:

For great amplitudes at low frequency, a liquid exchange occurs through the throttle orifice 8 which causes damping. At increasing frequencies, which occur with smaller amplitude in the motor vehicle, the vibrationally mounted or elastically bendably constructed intermediate plate 7 is excited so as to vibrate or oscillate without the occurrance of any liquid exchange from the upper chamber 1 to lower chamber 3 or the reverse. In this range, the damping is only very slight.

Measurements have shown that the inner pressure in the chamber at constant amplitudes increases with increasing frequency. This effect is utilized to reduce the liquid exchange further with the variable throttle 8 by reducing the throttle cross-section with increasing pressure gradient, and to close the throttle orifice completely at high frequencies. The damping is then entirely determined by the damping of the chamber wall 2.

Due to the thick-walled construction of this chamber 2 which is additionally braced by a metallic ring support 16 at the outside thereof, the motor mount additionally remains fully functional even for possible leaks and consequent escape of the chamber liquid, because the chamber wall 2 is capable of carrying the load by itself, and has over 90% of the total carrying capacity and of the static spring stiffness, respectively, of the motor mount filled with liquid.

A further advantage of the novel motor mount of the invention of the instant application is that the entire support flange 5, 6 is connected to the motor vehicle by an additional elastic support or bearing 21 with markedly progressive characteristic curve. For this purpose, there is provided below the flange half 6, an additional ring-flange 17 with a downwardly tapering conical ring 18, another rubber support 21 with a markedly progressive characteristic curve of weak damping being disposed between the outside of the conical ring 18 and a conical mating surface 19 of the actual mount or support 20. Thus, the whole mount according to the invention represents a double mounting or support, the mount being formed of a markedly progressive, weakly damping rubber support or bearing in series with an hydraulically damped support or bearing in the form of the hereinaforedescribed two-chamber motor mount. The serially connected rubber support 21 absorbs a great part of the high frequency vibrations of small amplitude and, in conjunction with the hereinaforedescribed measures i.e. the elastic mounted or elastically bendable intermediate plate 7 and the variable throttle 8, effects a very slight increase in dynamic stiffness or rigidity with increasing frequency. This results in a marked improvement in the isolation and damping values in the range beyond the resonance between the masses, primarily in the acoustic range.

Altogether, the two-chamber motor mount according to the invention is distinguished by a strong damping, especially of large vibration amplitudes with low frequency being damped only slightly in spite of the relatively simple construction thereof, the motor mount remains fully functional, additionally, even when leakage occurs, and provides good sound-damping in the acoustic range, notwithstanding the small size thereof, due to the construction thereof as a double-support or double bearing, utilizing the effect between the masses.

There are claimed:

1. Two-chamber motor mount with hydraulic damping, especially for motor vehicles, comprising an upper and a lower chamber having rubber-elastic walls and being filled with liquid, said upper chamber being of hollow conical construction, a holding flange disposed between said walls of said upper and lower chambers, an intermediate plate with a throttle orifice located in vicinity of and sealingly secured at the outer edge thereof to said holding flange, said throttle orifice being defined by a tube-shaped rubber insert extending substantially perpendicularly through said intermediate plate and having a substantially oval inner cross section said upper and said lower chambers being connected to one another through said intermediate plate solely via said throttle orifice for preventing an hydraulic response for high frequency vibrations of small amplitude, said intermediate plate being responsive to high frequency vibrations of small amplitude for closing said throttle orifice at high pressures.

2. Two-chamber motor mount according to claim 1 wherein said tube-shaped rubber insert is automatically compressible by a chamber pressure of at least approximately 2 bar and of maximally from 3 to 4 bar so as to close the flow-through cross section thereof.

3. Two-chamber motor mount according to claim 1 wherein said lower chamber is of substantially hemispherical construction.

4. Two-chamber motor mount according to claim 1 wherein said holding flange is of bipartite construction having an upper flange part whereon said hollow conical chamber wall of rubber-elastic material is seated, a face plate with a threaded bolt extending therefrom being disposed at the upper end face of said hollow conical chamber wall, said rubber-elastic wall of said lower chamber being in engagement with the lower flange part of said bipartite holding flange, said bipartite holding flange being formed with an inner peripheral groove wherein said intermediate plate formed with said throttle orifice is supported.

5. Two-chamber motor mount according to claim 4 including an additional, markedly progressive and low damping rubber bearing mounted on a support plate and supporting two heretofore defined features of the two-chamber motor mount, said heretofore defined features having a mass acting as intermediate mass of a series connection of the hydraulically damped heretofore defined features and said rubber bearing.

6. Two-chamber motor mount according to claim 1 wherein said intermediate plate is formed of elastically bendable material.

7. Two-chamber motor mount according to claim 1 wherein said intermediate plate is supported so as to vibrate.

8. Two-chamber motor mount according to claim 7, including two soft rubber bearings having markedly progressive characteristic curves forming the vibrational support for said intermediate plate.

* * * * *